(12) United States Patent
Kim et al.

(10) Patent No.: US 9,074,666 B2
(45) Date of Patent: Jul. 7, 2015

(54) POWER TRANSMISSION APPARATUS (75) Inventors: Dong Kyun Kim, Seoul (KR); Hong Shik Yun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/111,873

(22) PCT Filed: Apr. 13, 2012

(86) PCT No.: PCT/KR2012/002838
§ 371 (c)(1),
(2), (4) Date: Oct. 15, 2013

(87) PCT Pub. No.: WO2012/141539
PCT Pub. Date: Oct. 18, 2012

(65) Prior Publication Data
US 2014/0045642 A1   Feb. 13, 2014

(30) Foreign Application Priority Data

Apr. 13, 2011   (KR) .................. 10-2011-0034476

(51) Int. Cl.
*F16H 3/78* (2006.01)
*B62M 11/18* (2006.01)
*F16H 3/00* (2006.01)
*B62M 6/40* (2010.01)

(52) U.S. Cl.
CPC .................. *F16H 3/78* (2013.01); *B62M 11/18* (2013.01); *F16H 3/005* (2013.01); *B62M 6/40* (2013.01)

(58) Field of Classification Search
CPC ........... F16H 3/78; F16H 3/005; F16H 3/003; F16H 63/13; B62M 11/14; B62M 11/18; B62M 6/40

USPC ........... 475/219, 294, 302, 303, 300; 74/333, 74/334, 355, 361, 337.5, 404
See application file for complete search history.

(56) References Cited

U.S. PATENT DOCUMENTS

| 217,062 | A | * | 7/1879 | Chattaway | 475/300 |
| 815,642 | A | * | 3/1906 | Sears | 74/344 |
| 993,862 | A | * | 5/1911 | Michaud | 74/333 |
| 1,077,354 | A | * | 11/1913 | Lemay | 74/323 |
| 1,173,946 | A | * | 2/1916 | Gerard | 74/333 |
| 1,181,079 | A | * | 4/1916 | Kelso | 74/355 |

(Continued)

FOREIGN PATENT DOCUMENTS

| JP | 07-198002 A | 8/1995 |
| JP | 08-232978 A | 9/1996 |

(Continued)

OTHER PUBLICATIONS

International Search Report dated Nov. 27, 2012 for corresponding PCT Application No. PCT/KR2012/002838.
Notice of Allowance dated Mar. 21, 2013 for corresponding Korean Application No. 10-2011-0034476.

*Primary Examiner* — Roger Pang
(74) *Attorney, Agent, or Firm* — Ked & Associates, LLP (57) ABSTRACT

Disclosed is a power transmission apparatus. The power transmission apparatus includes a ring gear; first and second gears engaged with one side of the ring gear; a clutch interposed between the first and second gears and moved toward one of the first and second gears according to a rotational direction thereof so as to be coupled with one of the first and second gears; and a driving shaft providing power to the clutch.

15 Claims, 5 Drawing Sheets

(56) References Cited

U.S. PATENT DOCUMENTS

| | | | | |
|---|---|---|---|---|
| 2,039,147 | A * | 4/1936 | Dodge | 475/267 |
| 2,066,952 | A * | 1/1937 | Valdemar | 475/299 |
| 3,479,895 | A * | 11/1969 | Wegener | 74/333 |
| 4,924,720 | A * | 5/1990 | Shust | 74/377 |
| 7,757,576 | B1 * | 7/2010 | Einboeck | 74/335 |
| 2003/0096671 | A1 * | 5/2003 | Tanzer et al. | 475/300 |
| 2004/0187619 | A1 * | 9/2004 | Chiang | 74/404 |
| 2007/0227283 | A1 * | 10/2007 | Fujimoto et al. | 74/337.5 |

FOREIGN PATENT DOCUMENTS

| | | |
|---|---|---|
| JP | 2005308042 A | 11/2005 |
| JP | 2010-159868 A | 7/2010 |
| KR | 10-0135232 B1 | 4/1998 |
| KR | 10-2009-0115422 A | 11/2009 |

* cited by examiner

POWER TRANSMISSION APPARATUS

CROSS-REFERENCE TO RELATED PATENT APPLICATIONS

This application is a U.S National Stage Application under 35 U.S.C. §371 of PCT Application No. PCT/KR2012/002838, filed Apr. 13, 2012, which claims priority to Korean Patent Application No. 10-2011-0034476, filed Apr. 13, 2011, whose entire disclosures are hereby incorporated by reference.

TECHNICAL FIELD

The embodiment relates to a power transmission apparatus.

BACKGROUND ART

A power transmission apparatus is installed in a two-wheeled vehicle, such as a bicycle or a motorcycle. The power transmission apparatus provides transmission power using a motor or the like in order to realize high driving force by using little power.

The power transmission apparatus utilizes a gear system to maximize the output of the motor and the speed change is possible by driving the motor in the forward or reverse direction.

However, according to the power transmission apparatus of the related art, the driving force of the motor is converted by using a pin or a spring, so many components are necessary and the assembling process is complicated, resulting in the degradation of the durability and reliability.

DISCLOSURE

Technical Problem

The embodiment provides a power transmission apparatus having a novel structure.

The embodiment provides a power transmission apparatus having a simple structure and manufactured with a smaller number of components.

The embodiment provides a power transmission apparatus having the superior durability and reliability.

Technical Solution

A power transmission apparatus according to the embodiment includes a ring gear; first and second gears engaged with one side of the ring gear; a clutch interposed between the first and second gears and moved toward one of the first and second gears according to a rotational direction thereof so as to be coupled with one of the first and second gears; and a driving shaft providing power to the clutch.

Advantageous Effects

The embodiment can provide a power transmission apparatus having a novel structure.

The embodiment can provide a power transmission apparatus having a simple structure and manufactured with a smaller number of components.

The embodiment can provide a power transmission apparatus having the superior durability and reliability.

According to the embodiment, the ring gear always rotates in one direction, for instance, in the forward direction, even if the driving shaft rotates in the forward direction or the reverse direction, so various speed changes can be achieved by using one motor.

In addition, the clutch can be selectively coupled with gears, which are different from each other, according to the rotational direction thereof, so the structure can be simplified and the durability and the reliability can be improved.

BEST MODE

Mode for Invention

Hereinafter, embodiments will be described in more detail with reference to accompanying drawings.

Figure 1:
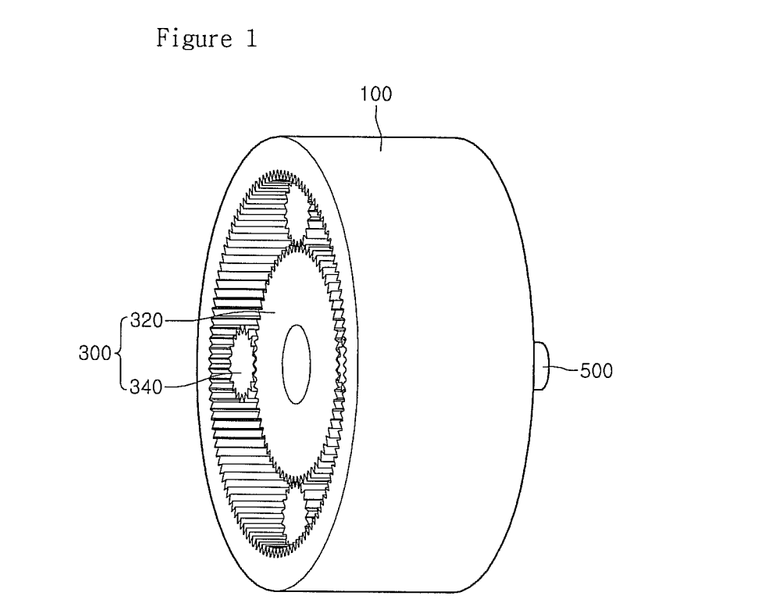
FIG. 1 is a perspective view showing a power transmission apparatus according to the embodiment.
Figure 2:
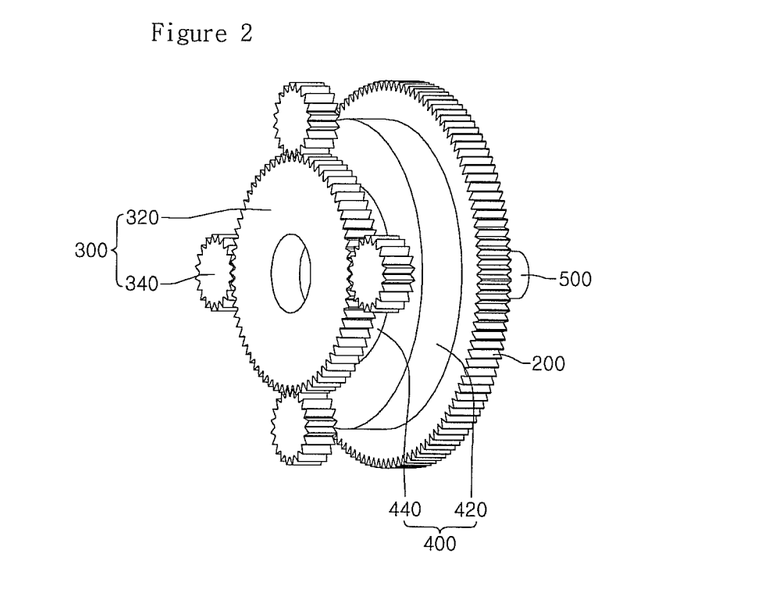
FIG. 2 is a perspective view showing components provided inside a ring gear of a power transmission apparatus according to the embodiment.
Figure 3:
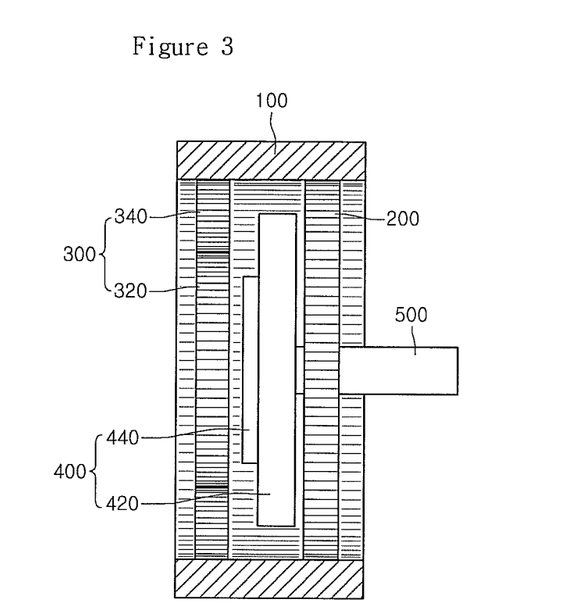
FIG. 3 is a sectional view of a power transmission apparatus according to the embodiment.
Figure 4:
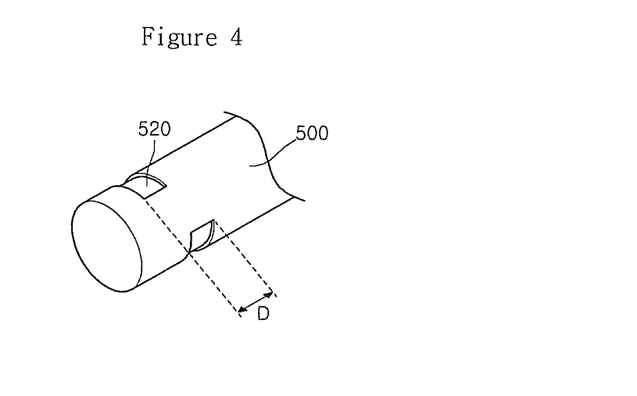
FIG. 4 is a perspective view showing a driving shaft of a power transmission apparatus according to the embodiment.
Figure 5:
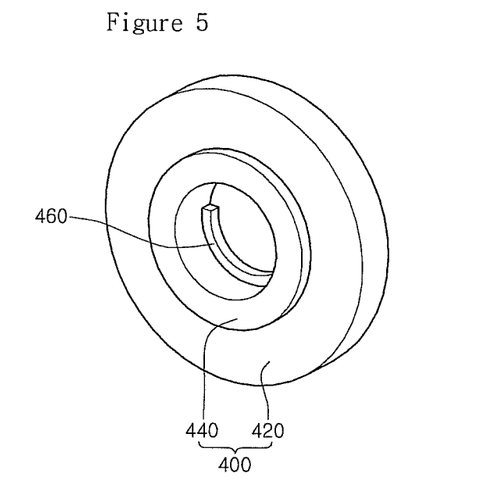
FIG. 5 is a perspective view showing a part of a clutch coupled with a driving shaft of a power transmission apparatus according to the embodiment.
Figure 6:
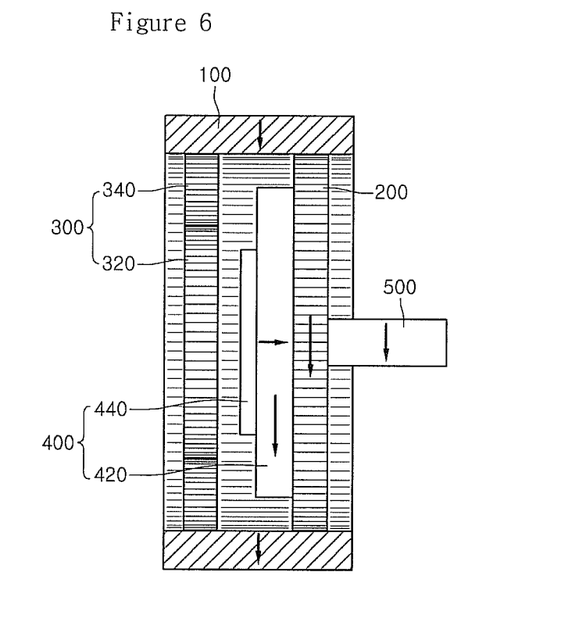
FIGS. 6 and 7 are sectional views showing the operation of a power transmission apparatus according to the embodiment.
Figure 7:
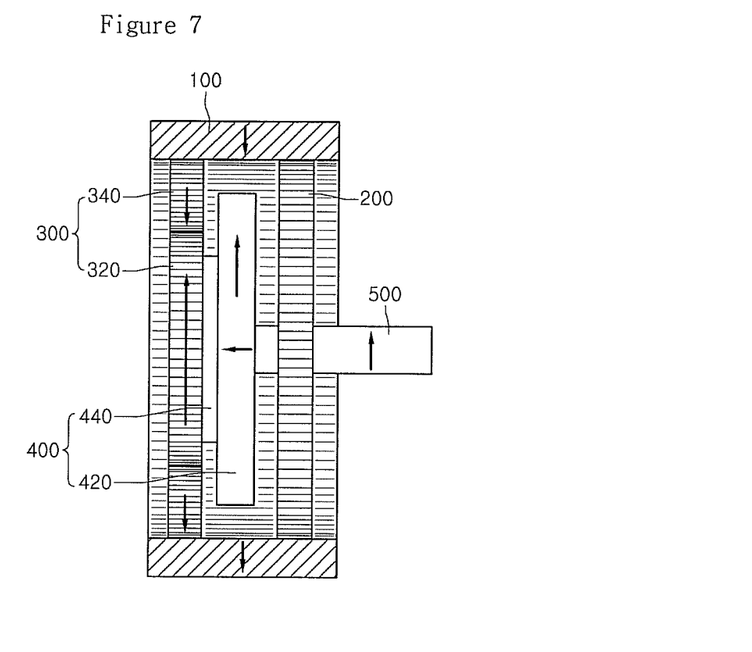

FIG. 1 is a perspective view showing a power transmission apparatus according to the embodiment, FIG. 2 is a perspective view showing components provided inside a ring gear of the power transmission apparatus according to the embodiment, FIG. 3 is a sectional view of the power transmission apparatus according to the embodiment, FIG. 4 is a perspective view showing a driving shaft of the power transmission apparatus according to the embodiment, FIG. 5 is a perspective view showing a part of a clutch coupled with the driving shaft of the power transmission apparatus according to the embodiment, and FIGS. 6 and 7 are sectional views showing the operation of the power transmission apparatus according to the embodiment.

Referring to FIGS. 1 to 3, the power transmission apparatus of the embodiment includes a ring gear 100, first and second gears 200 and 300 engaged with one side of the ring gear 100, a clutch 400 interposed between the first and second gears 200 and 300 and moved toward one of the first and second gears 200 and 300 according to the rotational direction thereof so as to be coupled with one of the first and second gears 200 and 300 and a driving shaft 500 providing power to the clutch 400.

The ring gear 100 is prepared in the Rhin of a hollow ring and has a predetermined width. The ring gear 100 is connected to a wheel or a pedal shaft (not shown) of a two-wheeled vehicle, such as a bicycle.

The first and second gears 200 and 300 are disposed inside the ring gear 100. The first and second gears 200 and 300 are spaced apart from each other and engaged with an inside of the ring gear 100 to rotate the ring gear 100. The inside of the ring gear 100 refers to the region between the driving shaft 500 and the ring gear or the plane directed to the driving shaft 500 and the outside of the ring gear 100 refers to the region opposite to the inside of the ring gear 100.

The first gear 200 may have a circular plate shape having a predetermined thickness. An outer surface of the first gear 200 is engaged with an inner wall of the ring gear 100. A perforation hole is formed at the center of the first gear 200 and the driving shaft 500 may extend by passing through the perforation hole of the first gear 200.

The second gear 300 is spaced apart from the first gear 200 and engaged with the inside of the ring gear 100 to rotate the ring gear 100. The second gear 300 may include a second sun gear 320 and second planet gears 340.

The second sun gear 320 has a circular plate shape having a predetermined thickness, and the second planet gears 340 are disposed at an outside of the second sun gear 320. The second planet gears 340 may have a diameter smaller than a diameter of the second sun gear 320. A plurality of second planet gears 340 are provided concentrically with the second sun gear 320. The rotational direction of the second planet gears 340 is opposite to the rotational direction of the second sun gear 320.

Thus, as the second sun gear 320 rotates, the second planet gears 340 provided concentrically with the second sun gear 320 may rotate in the direction opposite to the rotational direction of the second sun gear 320 and the ring gear 100 engaged with outer portions of the second planet gears 340 may rotate in the rotational direction of the second sun gear 320.

The clutch 400 is interposed between the first and second gears 200 and 300. In detail, the clutch 400 is disposed between the first and second gears 200 and 300 in order to rotate one of the first and second gears 200 and 300.

To this end, in a state that the clutch 400 is spaced apart from the first and second gears 200 and 300 by a predetermined distance, the clutch 400 can move toward the first gear 200 or the second gear 300 so as to be coupled with the first gear 200 or the second gear 300.

The movement direction of the clutch 400 is determined depending on the rotational direction of the clutch 400. For instance, if the clutch 400 rotates in the forward direction, the clutch 400 is moved and coupled with the first gear 200. In addition, if the clutch 400 rotates in the reverse direction, the clutch 400 is moved and coupled with the second gear 300.

The clutch 400 is coupled with the first and second gears 200 and 300 while making surface-contact with the first and second gears 200 and 300 and a coupling member (not shown) can be provided between one surface of the clutch 400 and one surface of the first gear 200 or the second gear 300 facing the one surface of the clutch 400.

The clutch 400 may include a first clutch 420 and a second clutch 440. The first clutch 420 is positioned adjacent to the first gear 200 and has a size corresponding to the size of the first gear 200.

The first clutch 420 can be integrally formed with the second clutch 440. In addition, the first clutch 420 can be formed separately from the second clutch 440 and then coupled to the second clutch 440.

The second clutch 440 has a size corresponding to the size of the second gear 300, that is, the size of the second sun gear 320. For instance, the second clutch 440 may have a diameter smaller than a diameter of the second sun gear 320. The second clutch 440 is coupled with the second sun gear 320 while making surface-contact with the second sun gear 320.

Therefore, the second clutch 440 may not interfere with the second planet gears 340 provided outside the second sun gear 320.

Although it has been described that the sizes of the first and second clutches 420 and 440 correspond to the sizes of the first and second gears 200 and 300, respectively, the embodiment is not limited thereto. For instance, the sizes of the first and second clutches 420 and 440 may be smaller than the sizes of the first and second gears 200 and 300, respectively.

According to the embodiment, the diameter of the first clutch 420 is smaller than the diameter of the first gear 200, the diameter of the second sun gear 320 is smaller than the diameter of the first clutch 420, the diameter of the second clutch 440 is smaller than the diameter of the second sun gear 320, and the second planet gears 340 have the diameter smaller than the diameter of the second clutch 440.

The clutch 400 is formed at the center thereof with the perforation hole and the driving shaft 500 is inserted into the perforation hole of the clutch 400. The driving shaft 500 is connected to a motor (not shown) to transfer the driving force of the motor to the clutch 400.

As shown in FIGS. 4 and 5, the driving shaft 500 has a cylindrical bar shape and a spiral groove 520 is formed at an end of the driving shaft 500 along the outer surface of the driving shaft 500.

The clutch 400 is coupled with the spiral groove 520 and moves in the axial direction of the driving shaft 500 along the spiral groove 520. Thus, the clutch 400 may move toward the first gear 200 or the second gear 300.

In order to couple the clutch 400 into the spiral groove 520 formed in the driving shaft 500, a thread 460 may protrude from the center of the clutch 400.

The thread 460 of the clutch 400 is fitted into the groove 520 formed in the driving shaft 500 in such a manner that the thread 400 may move along the groove 520 according to the rotation of the driving shaft 500.

If the driving shaft 500 rotates in the forward direction, the clutch 400 moves toward the first gear 200 so as to be coupled with the first gear 200. In addition, if the driving shaft 500 rotates in the reverse direction, the clutch 400 moves toward the second gear 300 so as to be coupled with the second gear 300.

A horizontal distance D between both ends of the groove 520 formed at the end of the driving shaft 500 may correspond to a distance between the first and second gears 200 and 300. Thus, the clutch 400 may move to the extent of the horizontal distance between the both ends of the groove 520 so that the clutch 400 can be coupled with one of the first and second gears 200 and 300.

As shown in FIG. 6, if the driving shaft 500 rotates in the forward direction, the clutch 400 coupled with the driving shaft 500 moves toward the first gear 200 and is coupled with the first gear 200.

The clutch 400 rotates in the rotational direction of the driving shaft 500. For instance, the clutch 400 rotates in the forward direction and the first gear 200 coupled with the clutch 400 also rotates in the forward direction identical to the rotational direction of the clutch 400.

Thus, the ring gear 100 engaged with the outer portion of the first gear 200 rotates in the forward direction together with the first gear 200.

As shown in FIG. 7, if the driving shaft 500 rotates in the reverse direction, the clutch 400 coupled with the driving shaft 500 moves toward the second gear 300 so as to be coupled with the second sun gear 320.

The clutch 400 rotates in the rotational direction of the driving shaft 500, that is, in the reverse direction and the second sun gear 320 coupled with the clutch 400 rotates in the rotational direction of the clutch 400, that is, in the reverse direction.

If the second sun gear 320 rotates in the reverse direction, the second planet gears 340 engaged with the outer portion of the second sun gear 320 rotate in the direction opposite to the rotational direction of the second sun gear 320, that is, in the forward direction.

As the second planet gears 340 rotate in the forward direction, the ring gear 100 engaged with the second planet gears 340 rotates in the rotational direction of the second planet gears 340, that is, in the forward direction.

As described above, according to the power transmission apparatus of the embodiment, the ring gear 100 always rotates in one direction, for instance, in the forward direction even if the driving shaft 500 rotates in the forward direction or the reverse direction, so various speed changes can be achieved by using one motor.

In addition, the clutch can be selectively coupled with the first and second gears 200 and 300 according to the rotational direction of the driving shaft 500, so the assembling work can be simplified and the durability and the reliability can be improved.

Further, according to the embodiment, a pin and a spring can be omitted, so that the number of components can be reduced and the assembling work can be improved.

Figure 8:
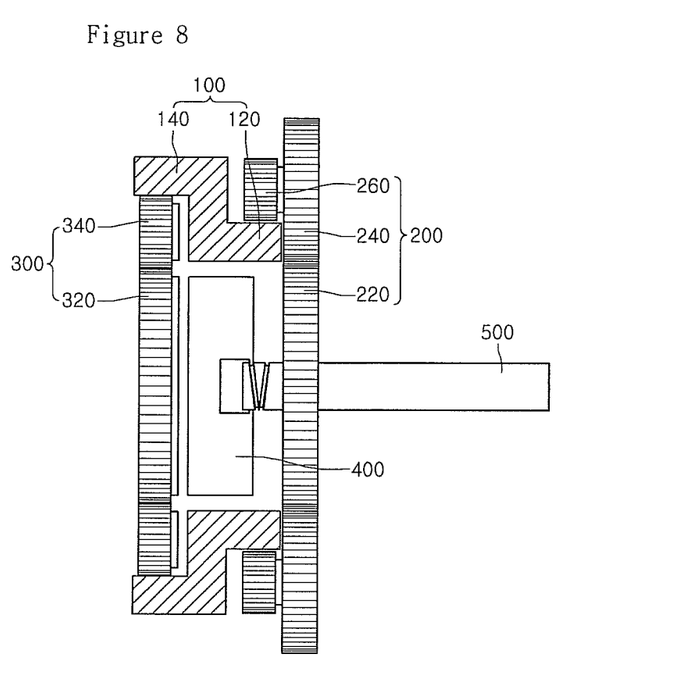
FIG. 8 is a sectional view of a power transmission apparatus according to another embodiment.

FIG. 8 is a sectional view of a power transmission apparatus according to another embodiment. Referring to FIG. 8, the power transmission apparatus according to another embodiment includes a ring gear 100, a first gear 200 engaged with an outer portion of the ring gear 100, a second gear 300 spaced apart from the first gear 200 and engaged with an inner portion of the ring gear 100, a clutch 400 disposed between the first and second gears 200 and 300 and coupled with one of the first and second gears 200 and 300 to rotate one of the first and second gears 200 and 300, and a driving shaft 500 for supplying power to the clutch 400.

The structure of the second gear 300 of the power transmission apparatus according to another embodiment is the same as that of the previous embodiment, so detailed description thereof will be omitted below.

The ring gear 100 has a ring shape in which the center is open and includes a first ring gear 120 and a second ring gear 140 having a diameter larger that a diameter of the first ring gear 120. Thus, the ring gear 100 has a stepped sectional shape.

The first gear 200 is provided at one side of the first ring gear 120 and engaged with an outer portion of the first ring gear 120 to rotate the first ring gear 120.

The first gear 200 may include a first sun gear 220 and first planet gears 240. A plurality of first planet gears 240 are disposed outside the first sun gear 220 concentrically with the first sun gear 220. Thus, the first planet gears 240 may rotate in the direction opposite to the rotational direction of the first sun gear 220. The first sun gear 220 and the first planet gears 240 are disposed at a lateral side of the first ring gear 120.

A plurality of auxiliary gears 260 are provided at one side of the first planet gears 240. The auxiliary gears 260 may be integrally formed with the first planet gears 240. In addition, the auxiliary gears 260 may be formed separately from the first planet gears 240 and then coupled to the first planet gears 240.

The diameter of the first planet gears 240 is smaller than the diameter of the first sun gear 220, and the diameter of the auxiliary gears 260 is smaller than the diameter of the first planet gears 240.

The first ring gear 120 is disposed inside the auxiliary gears 260 in such a manner that the first ring gear 120 may rotate in the direction opposite to the rotational direction of the auxiliary gears 260. In detail, the auxiliary gears 260 are disposed at an outer peripheral surface of the first ring gear 120 in such a manner that the first ring gear 120 is positioned among the auxiliary gears 260.

The second gear 300 is provided inside the second ring gear 140 such that the second gear 300 may rotate in the rotational direction of the second planet gears 340 of the second gear 300.

The clutch 400 is disposed between the first and second gears 200 and 300. The clutch 400 has a circular plate shape having a predetermined thickness. The clutch 400 moves toward the first gear 200 or the second gear 300 according to the rotational direction thereof and is coupled with one of the first gear 200 and the second gear 300 in order to rotate one of the first gear 200 and the second gear 300.

The clutch 400 has a size corresponding to or smaller than a size of the first sun gear 220 of the first gear 200. Thus, the clutch 400 can be operated independently from the first planet gears 240.

In addition, the clutch 400 has a size corresponding to or smaller than a size of the second sun gear 320 in such a manner that the clutch 400 may not interfere with the second planet gears 340 of the second gear 300.

Although it has been described that the clutch 400 has the size smaller than the size of the first sun gear 220 and the second sun gear 320, the embodiment is not limited thereto. For instance, two clutches having the size corresponding to the size of the first sun gear 220 and the second sun gear 320 can be provided.

Thus, as the driving shaft 500 rotates in the forward direction, the clutch 400 moves toward the first gear 200 and is coupled with the first sun gear 220. Accordingly, the first sun gear 220 may rotate in the rotational direction of the driving shaft 500, that is, in the forward direction.

The first planet gears 240 engaged with the outer side of the first sun gear 220 may rotate in the direction opposite to the rotational direction of the first sun gear 220, that is, in the reverse direction and the auxiliary gears 260 engaged with the first planet gears 240 also rotate in the reverse direction.

Therefore, the ring gear 100 engaged with the auxiliary gears 260 may rotate in the direction opposite to the rotational direction of the auxiliary gears 260, that is, in the forward direction.

In contrast, as the driving shaft 500 rotates in the reverse direction, the clutch 400 moves toward the second gear 300 and is coupled with the second sun gear 320.

Accordingly, the second sun gear 320 may rotate in the rotational direction of the driving shaft 500, that is, in the reverse direction.

The second planet gears 340 engaged with the outer side of the second sun gear 320 may rotate in the direction opposite to the rotational direction of the second sun gear 320, that is, in the forward direction. The ring gear 100 engaged with the outer portion of the second planet gears 340 may rotate in the rotational direction of the second planet gear 340, that is, in the forward direction.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Industrial Applicability

The embodiment can be employed in various power transmission apparatuses used in various technical fields.

The invention claimed is:

1. A power transmission apparatus comprising:
   a single rotary member having gear teeth located on one or both sides;
   first and second gear sets provided with respective gears engaged with the gear teeth of the single rotary member;
   a clutch interposed between the first and second gear sets and moved toward one of the first and second gear sets according to a rotational direction thereof so as to be coupled with one of the first and second gear sets; and
   a driving shaft providing power to the clutch.

2. The power transmission apparatus of claim 1, wherein the first and second gear sets are spaced apart from each other at an inside of the single rotary member.

3. The power transmission apparatus of claim 1, wherein the driving shaft is formed on an outer surface thereof with a spiral groove, and the clutch moves in an axial direction of the driving shaft along the spiral groove.

4. The power transmission apparatus of claim 1, wherein the second gear set includes a second sun gear and a second planet gear engaged with an outer portion of the second sun gear.

5. The power transmission apparatus of claim 4, wherein a plurality of second planet gears are disposed concentrically with the second sun gear.

6. The power transmission apparatus of claim 5, wherein a diameter of the second sun gear is smaller than a diameter of the first gear set, a diameter of the second planet gear is smaller than the diameter of the second sun gear, and the second planet gear is engaged with an inner portion of the single rotary member.

7. The power transmission apparatus of claim 1, wherein the clutch includes a first clutch having a size corresponding to a size of the first gear set and a second clutch having a size corresponding to a size of the second gear set, and a diameter of the first clutch is larger than a diameter of the second clutch.

8. The power transmission apparatus of claim 1, wherein the clutch is coupled with the first gear set to rotate the single rotary member in the forward direction when the clutch rotates in a forward direction, and the clutch is coupled with the second gear set to rotate the single rotary member in the forward direction when the clutch rotates in a reverse direction.

9. The power transmission apparatus of claim 1, wherein the single rotary member includes a first part and a second part having a diameter larger than a diameter of the first part.

10. The power transmission apparatus of claim 9, wherein the first gear set is engaged with an outer portion of the first part of the single rotary member.

11. The power transmission apparatus of claim 10, wherein the first gear set includes a first sun gear and a first planet gear located outside the first sun gear.

12. The power transmission apparatus of claim 11, wherein the first gear set further includes an auxiliary gear provided at one side of the first planet gear, and the auxiliary gear is engaged with an outer portion of the first part of the single rotary member.

13. The power transmission apparatus of claim 12, wherein the auxiliary gear has a diameter smaller than a diameter of the first planet gear and the diameter of the first planet gear is smaller than a diameter of the first sun gear.

14. The power transmission apparatus of claim 11, wherein the first sun gear and the first planet gear are disposed at a lateral side of the first part of the single rotary member.

15. The power transmission apparatus of claim 9, wherein the second gear set includes a second sun gear and a second planet gear engaged with an outer portion of the second sun gear, and the second planet gear is engaged with an inner portion of the second part of the single rotary member.

* * * * *